United States Patent [19]

Drüppel et al.

[11] Patent Number: 4,984,771
[45] Date of Patent: Jan. 15, 1991

[54] HEATING SYSTEM FOR STEEL CASTING LADLES

[75] Inventors: Johannes Drüppel; Hermann Schlagböhmer, both of Oberhausen, Fed. Rep. of Germany

[73] Assignee: M.A.N. Maschinenfabrik Augsburg-Nüremberg AG, Oberhausen, Fed. Rep. of Germany

[21] Appl. No.: 811,642

[22] Filed: Dec. 20, 1985

[30] Foreign Application Priority Data

Dec. 21, 1984 [DE] Fed. Rep. of Germany ....... 3446833

[51] Int. Cl.⁵ .............................................. C21B 7/00
[52] U.S. Cl. .................................... 266/142; 266/158; 266/287
[58] Field of Search ............... 266/142, 158, 165, 287, 266/901; 373/50, 52, 69, 94

[56] References Cited

U.S. PATENT DOCUMENTS

| 3,026,162 | 3/1962 | McFeaters | 266/142 |
| 3,379,815 | 4/1968 | Parker | 266/142 |
| 3,907,260 | 9/1975 | Leatherby | 266/287 |

FOREIGN PATENT DOCUMENTS 0772234 11/1967 Canada .................................. 373/94

Primary Examiner—S. Kastler
Attorney, Agent, or Firm—McGlew & Tuttle

[57] ABSTRACT

Steel casting ladles present at different locations are supplied alternately with one heating system for all of the steel casting ladles. The heating system including current bearing heating cables is arranged on a wheelable platform which in turn is present on a swivel stage. For supplying the ladles the rotary motion of the swivel stage is combined with the to-and-fro motion of the wheelable platform.

5 Claims, 1 Drawing Sheet

HEATING SYSTEM FOR STEEL CASTING LADLES

FIELD AND BACKGROUND OF THE INVENTION

The invention relates in general to steel casting and in particular to a new and useful heating system for steel casting ladles.

For heating the molten steel in a steel casting ladle, the use of stationary or pivotable heating systems is known. Pivoting heating systems are used when the ladle is placed under the heating system by means of a crane, or when two ladles to be heated are arranged side by side in such a way that they are still in the swivel zone of the electrodes.

SUMMARY OF THE INVENTION

The invention provides a system to heat, with one heating system, alternately several steel casting ladles. The ladles themselves are stationary but are spaced from each other and, in relation to the heating system are so far apart that they cannot be supplied by the pivotable heating system of the prior art.

With the erection of two or more melting units (e.g. converters) in the steel mill at the distance between centers required therefor, in fact, a correspondingly large spacing of the steel casting ladles coming from the melting units necessarily results.

SUMMARY OF THE INVENTION

In accordance with the invention a heating system for steel casting ladles includes a plurality of ladles of different locations along a path. Each of the ladles is connectable into an electrode heating system by means of a movable support which carries the electrode arm and its connecting current cable. Support is arranged so that one portion of the support includes an arm with a platform which moves on a swivel stage portion. An electrical current cable is connected from a base for the support which advantageously comprises a housing for a transformer. The current arm extends outwardly from the transformer housing through an opening in the support platform and is guided on guide elements along a movable platform which carries an arm which may be maneuvered to overlie each casting ladle in turn. The construction includes a swivel stage overlying the transformer housing and a platform which is slidable inwardly and outwardly on the swivel stage and has a projecting arm position in which an electrode carrying arm is journalled.

By combining the rotary motion of the swivel stage with the travel motion of the platform on which the heating system is stationed, it is now possible to reach with one and the same heating system several steel casting ladles, which are positioned in accordance with the required spacings between centers of the melting units. As a result, the steel mill hall is not blocked by oversize swivel radii of the heating system.

With the system according to the invention, it is further achieved that the phase symmetry of the heavy current cables is preserved to a very large extent. The heavy current cables, which go from the heating transformer through the pivot of the swivel stage upward to the cable carrying console, have a length such as to permit safe twisting due to the swivel movement. The cables placed above the pivot, i.e. going from the cable carrying console to the heating system on the wheelable platform, can absorb the motion of the platform and the electrode excursion. Accordingly, it is an object of the invention to provide a heating system for steel casting ladles which comprises a plurality of steel casting ladles located at different locations along a path and a heating system which includes a platform arranged on a swivel stage which rotates over an electrical conduit connection at one end of the platform which includes guides for the cable extending to the outer end of the platform and which may be rotated and moved inwardly and outwardly so as to service each casting ladle along the path.

A further object of the invention is to provide an arrangement for heating casting ladles which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
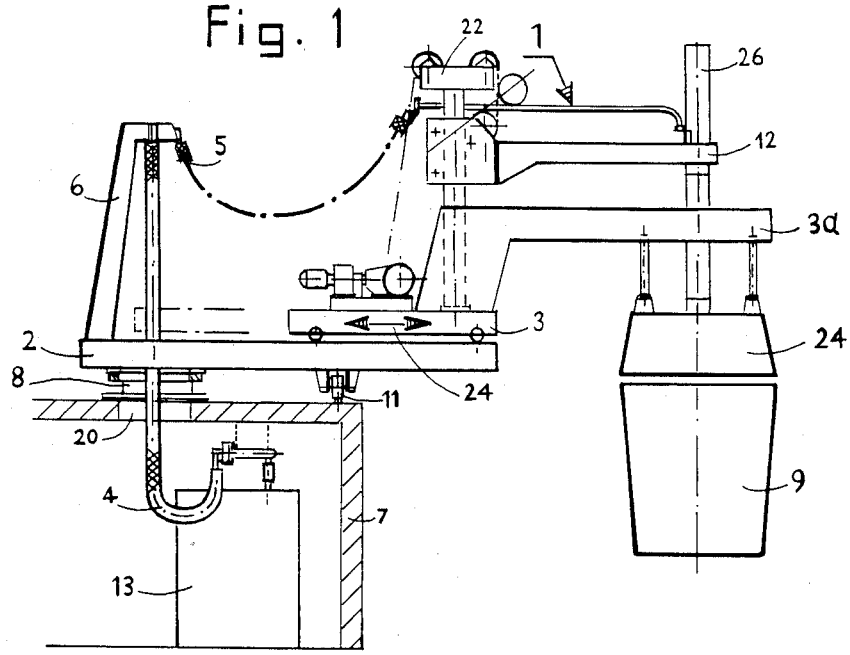
FIG. 1 is a side elevational view partly in section of the heating system constructed in accordance with the invention.

Referring to the drawings in particular, the invention embodied therein comprises a heating system for servicing a plurality of steel casting ladles 9 and 10 which are arranged in a selected path, for example around a circular path and which must be heated. In accordance with the invention an electrical heating system for the steel casting ladles 9 and 10 includes a heating transformer 13 arranged in a transformer housing 7. A current cable extends from the transformer 13 upwardly through an opening 20 in the transformer housing 7 and through a corresponding opening in a swivel mount 8 for a swivel stage 2 which is mounted on a rotatable bearing over the opening 20. A cable 4 is supported on a console 6 and an outer portion thereof 5 extends through guides 22 arranged on a platform 3 which facilitate the inward and outward movement of the platform 3 in a direction of the double arrows 24 on the supporting swivel stage 2. Platform 3 has an arm portion 3a which carries a heating cap 24 which may be maneuvered by the movement of the platform 3 in the swivel stage 2, so that it may be positioned in association with a steel ladle 9 or 10. The guide means for the current cables 4 and 5 include an electrode carrying arm 12 supporting electrodes 26.

The heating system 1 for steel casting ladles is arranged on a platform 3 movable forward and back. The electrode carrying arm is designated by 12.

The platform 3 moves in the direction of the double arrow on the swivel stage 2 on rollers by means of a hydraulic or electric drive (not shown). The stage 2 has its pivot on a bearing 8 and swivels about the pivot on rollers 11 by means of a swivel drive (not shown ) see FIG. 2.

Figure 2:
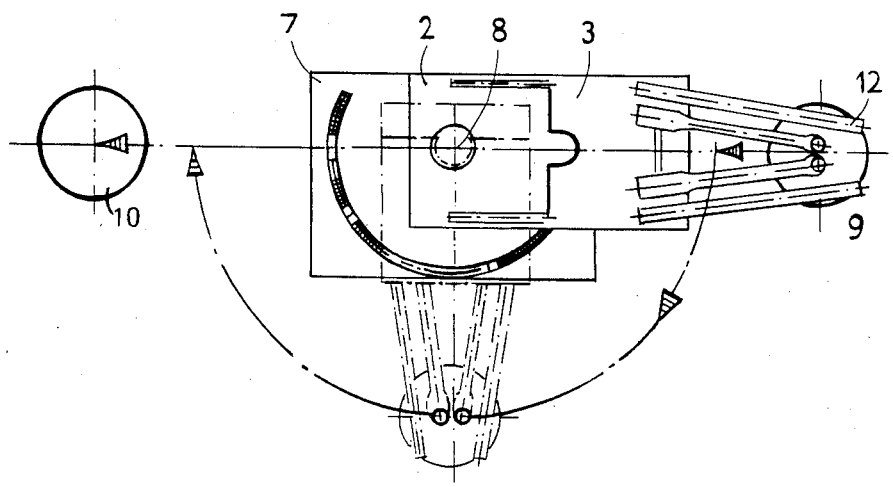
FIG. 2 is a top plan view of the heating system.

In FIG. 2, two steel casting ladles 9 and 10 are indicated. The heating system 1 is located in a heating position at the steel casting ladle 9.

As shown in FIG. 1, the swivel stage 2 is mounted on the transformer house 7, in which the heating transformer 13 is located. From the heating transformer 13 heavy current cables 4 go vertically upward to the cable carrying console 6. At the console the heavy current cables 5 are connected, which lead to the heating system 1 and are there connected to the electrode carrying arm 12. The length of the heavy current cables 5 is such that they can absorb the movement path of the platform 3 and the electrode excursion.

While a specific embodiment of the invention has been shown and described in detail to illustrate the application of the principles of the invention, it will be understood that the invention may be embodied otherwise without departing from such principles.

What is claimed is:

1. A heating system steel casting ladles, comprising a plurality of steel casting ladles located at different locations along a path, the heating system for said casting ladles including a support, a swivel stage rotatably mounted on said support and a platform movable inwardly and outwardly on said swivel stage and having an outer end, an electrode supported on said outer end, a current supplying cable connected to said electrode and means guiding said cable along said platform and said stage.

2. A heating system according to claim 1, including a transformer housing having a connection for said electrical current cable, said stage being rotatably mounted over said platform and said cable extending through an opening of said stage.

3. A heating system according to claim 2, wherein said stage has an opening therethrough with a rotatable bearing at said opening, said current cable extending through the opening and a current supply housing upon which said stage is rotatable supporting said bearing.

4. A device for heating molten steel in steel casting operations, comprising a transformer housing having a top wall with an opening therein, a swiveled stage mounted on said top wall over said opening, a console extending upwardly from said stage, a heating transformer in said housing, a pivotal mount for mounting said swivel stage on said top wall over said opening to permit rotation around said opening, a transformer current cable connected to said heating transformer and extending through said top wall opening and through said pivotal mount through said console, a platform moveable on said stage toward and away from said pivotal mount, and electrode guide means on said platform, an electrode bearing arm extending outwardly from said platform, and an electrode on said arm, said current cable including an outer portion extending from said console over said guide means to said electrode.

5. A device according to claim 4, including roller means on said electrode carrier arm forming a guide for said current cable, said electrode being carried at the outer end of said arm and including means underlying said arm carried by said platform for supporting casting ladles for positioning said ladle in respect to said electrode.

* * * * *